US012618730B2

(12) United States Patent
Hsu et al.

(10) Patent No.: US 12,618,730 B2
(45) Date of Patent: May 5, 2026

(54) TORQUE SENSOR FOR A BICYCLE OR AN ELECTRIC BICYCLE

(71) Applicant: GIANT MANUFACTURING CO., LTD., Taichung City (TW)

(72) Inventors: Che-Wei Hsu, Taichung City (TW); Tzu-Yang Hsiao, New Taipei City (TW); Yu-Kai Lin, Taichung City (TW)

(73) Assignee: GIANT MANUFACTURING CO., LTD, Taichung City (TW)

( * ) Notice: Subject to any disclaimer, the term of this patent is extended or adjusted under 35 U.S.C. 154(b) by 867 days.

(21) Appl. No.: 17/664,869

(22) Filed: May 24, 2022

(65) Prior Publication Data

US 2023/0384176 A1 Nov. 30, 2023

(51) Int. Cl.
G01L 3/10 (2006.01)
B62M 6/50 (2010.01)
B62J 45/411 (2020.01)
B62J 45/421 (2020.01)

(52) U.S. Cl.
CPC ............... G01L 3/102 (2013.01); B62M 6/50 (2013.01); B62J 45/411 (2020.02); B62J 45/421 (2020.02); G01L 3/10 (2013.01)

(58) Field of Classification Search
CPC ... G01L 3/10; G01L 3/102; B62M 6/50; B62J 45/411; B62J 45/421
USPC ...................................... 73/862.331–862.336
See application file for complete search history.

(56) References Cited

U.S. PATENT DOCUMENTS

| | | | | |
|---|---|---|---|---|
| 4,817,444 | A | * | 4/1989 | Yagi ........................ G01L 3/102 73/DIG. 2 |
| 4,899,597 | A | * | 2/1990 | Yagi ........................ G01L 3/105 73/862.335 |
| 5,526,704 | A | * | 6/1996 | Hoshina ................. G01L 3/105 73/862.333 |
| 2022/0135179 | A1 | | 5/2022 | Lee |

FOREIGN PATENT DOCUMENTS

| | | |
|---|---|---|
| CN | 109178186 A | 1/2019 |
| CN | 109572916 A | 4/2019 |
| JP | H 05240721 A | 9/1993 |
| WO | 2019/146637 A1 | 8/2019 |

* cited by examiner

*Primary Examiner* — Jonathan M Dunlap
(74) *Attorney, Agent, or Firm* — Finnegan, Henderson, Farabow, Garrett & Dunner, L.L.P.

(57) ABSTRACT

A torque sensor includes a sleeve member configured to be mounted on a center shaft, and a tubular sensor body arranged coaxially with the sleeve member. At least one outer surface of the sleeve member includes one or more magnetostrictive elements. The tubular sensor body includes a bobbin for mounting a sensor coil. An induced current in the sensor coil is detected in response to pedaling by a user. The tubular sensor body includes one or more inclined surfaces inclined with respect to a radial direction of the torque sensor, the one or more inclined surfaces being coupled with the sleeve member or the center shaft.

20 Claims, 13 Drawing Sheets

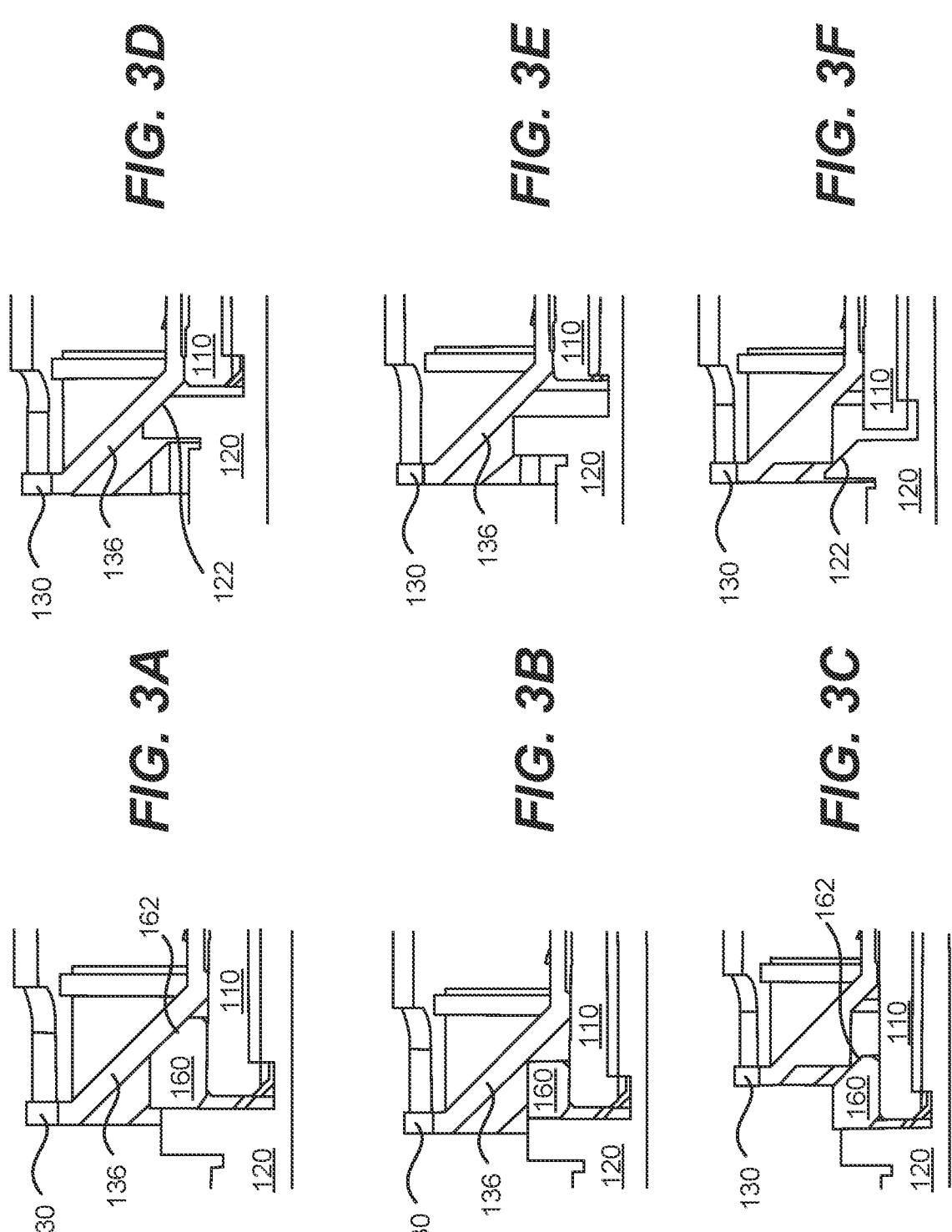

TORQUE SENSOR FOR A BICYCLE OR AN ELECTRIC BICYCLE

TECHNICAL FIELD

The disclosure relates to a power measuring device for use with a bicycle or with an electric bicycle, and more particularly, to torque sensors that measure the torque in response to pedaling by a cyclist riding the bicycle or the electric bicycle.

BACKGROUND

Cycling has been popular for its various roles, including transportation, travel, leisure, exercise, sports, and competition. Cycling's popularity spans all demographics of users, and includes recreational riders, amateur riders, avid rides, professional riders, and athletes. In recent years, with the development of new technologies, various electric bicycles have become available that operate based on electric power or in a hybrid operating state involving both electric power and pedaling.

In various bicycle or electric bicycle applications, a torque sensor that usually cooperates with the bottom bracket of the bicycle is applied to detect the torque generated by a cyclist during the pedaling movement, which can be processed and used as parameters for controlling the bicycle or the electric bicycle. However, in conventional designs, the accuracy and precision of the torque sensing are poor due to the undesired displacement of the torque sensor either along an axial direction or along a radial direction.

SUMMARY OF THE PRESENT DISCLOSURE

Consistent with some embodiments, a torque sensor is provided. The torque sensor includes a sleeve member configured to be mounted on a center shaft, and a tubular sensor body arranged coaxially with the sleeve member. At least one outer surface of the sleeve member includes one or more magnetostrictive elements. The tubular sensor body includes a bobbin for mounting a sensor coil. An induced current in the sensor coil is detected in response to pedaling by a user. The tubular sensor body includes one or more inclined surfaces inclined with respect to a radial direction of the torque sensor, the one or more inclined surfaces being coupled with the sleeve member or the center shaft.

Consistent with some embodiments, a torque sensor is provided. The torque sensor includes a sleeve member configured to be mounted on a center shaft and a tubular sensor body arranged coaxially with the sleeve member. At least one outer surface of the sleeve member includes one or more magnetostrictive elements. The tubular sensor body includes a bobbin for mounting a sensor coil. An induced current in the sensor coil is detected in response to pedaling by a user. The sleeve member or the center shaft includes one or more inclined surfaces inclined with respect to a radial direction of the torque sensor, and configured to abut the tubular sensor body.

Consistent with some embodiments, a torque sensor is provided. The torque sensor includes a sleeve member mounted on a center shaft, a tubular sensor body arranged coaxially with the sleeve member, and an annular member abutting at least one of the sleeve member or the tubular sensor body. The sleeve member includes one or more magnetostrictive elements affixed to a surface of the sleeve member. The tubular sensor body includes a bobbin for mounting a sensor coil. An induced current in the sensor coil is detected in response to pedaling by a user. The annular member includes an inclined surface inclined with respect to a radial direction of the torque sensor.

It is to be understood that the foregoing general descriptions and the following detailed descriptions are exemplary and explanatory only, and are not restrictive of the disclosure, as claimed.

DETAILED DESCRIPTION OF THE DRAWINGS

Aspects of the present disclosure are best understood from the following detailed description when read with the accompanying figures. The accompanying drawings, which are incorporated in and constitute a part of this specification, illustrate several exemplary embodiments and, together with the corresponding descriptions, provide examples for explaining the disclosed embodiment consistent with the present disclosure and related principles. It is noted that, in accordance with the standard practice in the industry, various features are not drawn to scale. In fact, the dimensions of the various features may be arbitrarily increased or reduced for clarity of discussion.

FIGS. 3A-3I are diagrams illustrating examples of arrangements of corresponding portions at a non-drive side of the torque sensor, according to some embodiments of the present disclosure.

DETAILED DESCRIPTION

Figure 1:
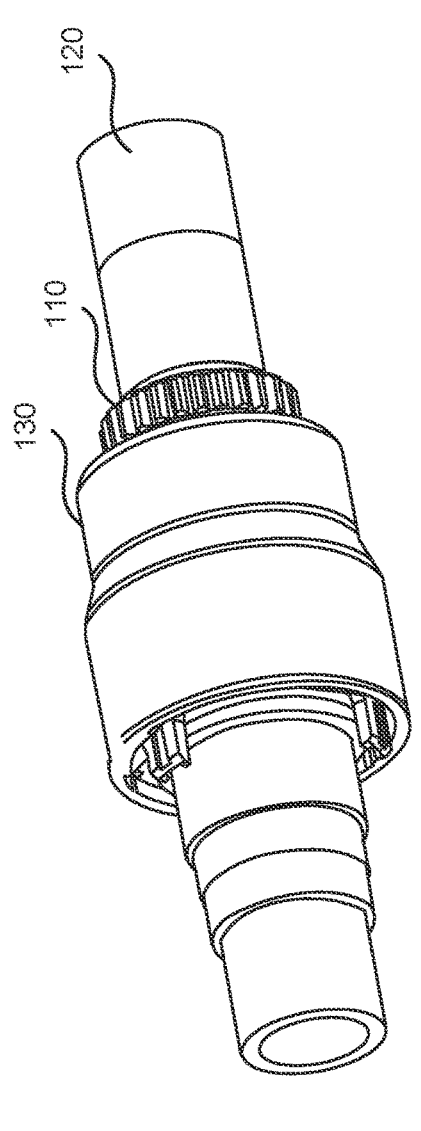
FIG. 1 is a perspective view of a torque sensor, according to some embodiments of the present disclosure.

Reference will now be made in detail to embodiments, examples of which are illustrated in the accompanying drawings and disclosed herein. The implementations set forth in the following description of embodiments are examples of systems and methods consistent with the aspects related to the disclosure and do not limit the scope of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
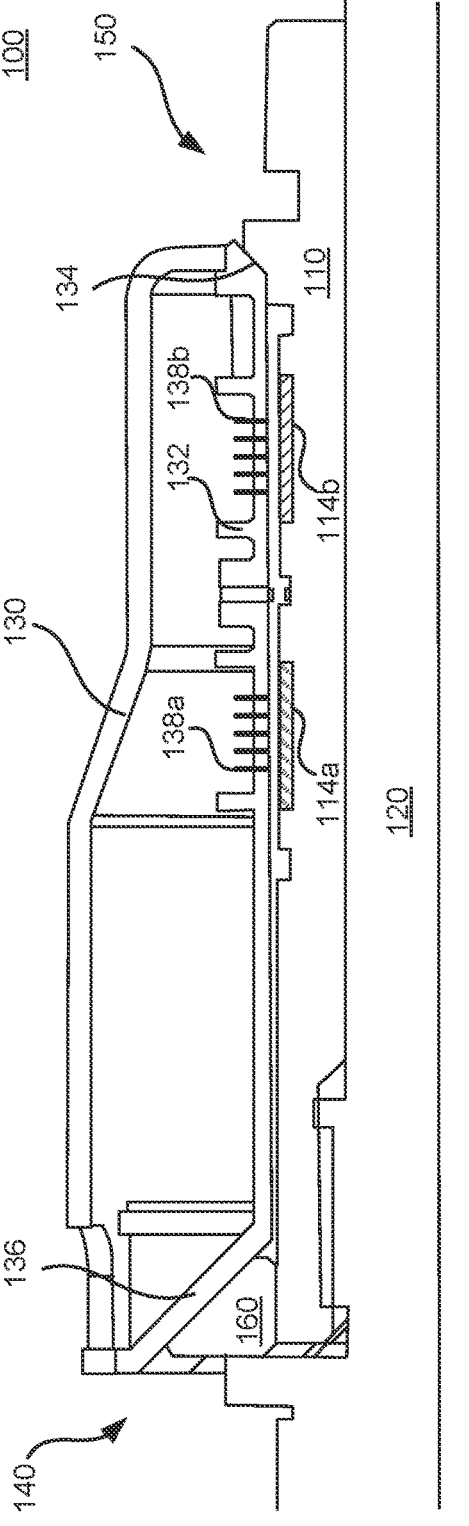
FIG. 2 is a cross-sectional view of the torque sensor of FIG. 1, according to some embodiments of the present disclosure.

FIG. 1 is a perspective view of a torque sensor 100, according to some embodiments of the present disclosure. FIG. 2 is a cross-sectional view of the torque sensor 100 of FIG. 1, according to some embodiments of the present disclosure. In the embodiments of FIG. 1 and FIG. 2, the torque sensor 100 may cooperate with a bottom bracket of a bicycle or an electrical bicycle and be configured to detect a torque generated by the pedaling of a cyclist. The torque sensor 100 includes a sleeve member 110 with chevron pattern portions 114a, 114b mounted on a center shaft 120 of the bottom bracket, and a tubular sensor body 130 arranged coaxially with the sleeve member 110.

The sleeve member 110 with chevron pattern portions 114a, 114b includes one or more magnetostrictive elements affixed to an outer surface of the sleeve member 110. In some other embodiments, the sleeve member 110 may be formed using magnetostrictive material, which can convert kinetic energy to magnetic energy and can be used, for example, in applications like sensors or actuators. The magnetostrictive material is not limited to any particular composition. In some embodiments, the magnetostrictive material may include magnetic metal oxides such as magnetite, amorphous metals, and ferromagnetic metals and alloys such as nickel-iron (NiFe). The magnetostrictive material may also include ferrites or oxides of ferromagnetic metals or alloys. For example, the magnetostrictive material may include Terfenol-D, which is an alloy of terbium, dysprosium, and iron metals. For example, the magnetostrictive material may include Cobalt ferrite, $CoFe_2O_4$.

Accordingly, a change in magnetic properties (e.g., the magnetic permeability) of the sleeve member 110 occurs due to the applied stress and torque. As shown in FIG. 2, the tubular sensor body 130 includes a bobbin 132 for mounting one or more sensor coils 138a, 138b. In response to the pedaling of the user providing the torque applied to the surface of the sleeve member 110, an induced current in the sensor coil can be detected to measure a torque value. In some embodiments, various circuits and other components (e.g., controllers, ICs, etc.) can be placed within the tubular sensor body 130, in order to process the detected induced current to determine the torque value or provide other functions. For example, communication circuit(s) may be placed either within or externally to the tubular sensor body 130 to exchange data between the torque sensor 100 and external device(s) either through wires or wirelessly.

In some embodiments in which a torque value is obtained, after the torque value is obtained, the bicycle or the electrical bicycle may be controlled, at least partially based on the torque value. For example, the bicycle or the electrical bicycle may include a control system configured to capture additional data, including, for example, estimating a current slope, or calculating power, based on the torque value data received from the torque sensor 100 via wired or wireless communications. The electrical bicycle may include a motor controller having one or more motor control circuits, such as closed loop torque control circuits and/or closed loop speed control circuits, for generating proper driving signal(s) to drive motors of the electrical bicycle according to the current torque value in response to the pedaling of the rider.

Optionally, the bicycle or the electrical bicycle may further store the received data and/or calculated power data in a memory unit or transmit the received data (or the calculated power data) to an external device via wired or wireless communications. For example, the external device may be a computer, a smartphone, a tablet device, a wearable device, or any other suitable electronic device. Accordingly, the external device may store the detected torque values, calculate the cycling power, analyze the user's activities and/or display the information on a display unit, such as an LCD display, an LED display, a touch screen, or the like.

As shown in FIG. 2, in some embodiments, at a non-drive side 140 (e.g., the left side) of the bottom bracket, the tubular sensor body 130 may be directly or indirectly coupled to the center shaft 120. At a drive side 150 (e.g., the right side) of the bottom bracket, the tubular sensor body 130 may be directly or indirectly coupled to the sleeve member 110.

For example, in the embodiment of FIG. 2, the tubular sensor body 130 may include inclined surfaces 134 and 136 inclined with respect to the radial direction of the torque sensor 100. In some embodiments, the inclined surfaces 134 and 136 may be conical peripheral surfaces. The inclined surface 134 may be coupled with the sleeve member 110, and the inclined surface 136 may be coupled, indirectly via an annular member 160, with the center shaft 120 to prevent a relative movement between sensor coils 138a, 138b located on the bobbin 132 and the sleeve member 110 with chevron pattern portions 114a, 114b. Particularly, the annular member 160 may be configured to surround the sleeve member 110 and abut the inclined surface 136 and the center shaft 120. The annular member 160 may be configured to deform to eliminate a gap between the annular member 160 and the sleeve member 110, or a gap between the annular member 160 and the bobbin 132 of the tubular sensor body 130.

Accordingly, in embodiments in which the annular member 160 is deformed, along an axial direction of the tubular sensor body 130, the force applied from the center shaft 120 is transmitted via the annular member 160 to the inclined surface 136 at the non-drive side 140, and the force applied from the sleeve member 110 may be transmitted to the inclined surface 134 at the drive side 150. With the deformed annular member 160 removing the gaps, the forces applied to inclined surfaces 134 and 136 respectively provide a component of force in the direction along the radial direction, which prevents undesired offsets or displacements of the tubular sensor body 130 in the radial direction. Particularly, the forces applied to inclined surfaces 134 and 136 prevent the relative movement between the sensor coils 138a, 138b located on the bobbin 132 and the sleeve member 110. Similarly, the forces applied to inclined surfaces 134 and 136 also provide a component of force in the direction along the radial or the axial direction, which prevents undesired offsets or displacements of the tubular sensor body 130 in the radial or the axial direction. Accordingly, the relative movement between the bobbin 132 of the tubular sensor body 130 and the sleeve member 110 is avoided or reduced in both the radial or the axial direction. Thus, the accuracy and precision of the torque sensed by the torque sensor 100 can be improved, which provides a better user experience for cyclists.

In various embodiments, at the non-drive side 140, the tubular sensor body 130 may be coupled, directly or indirectly, with the center shaft 120 using different designs of the tubular sensor body 130, the center shaft 120, or the annular member 160. FIGS. 3A-3I are diagrams illustrating examples of arrangements of corresponding portions of the tubular sensor body 130 and the center shaft 120 at the non-drive side 140, according to some embodiments of the present disclosure. In various embodiments, the arrangements and designs depicted in FIGS. 3A-3I may be used to modify the torque sensor 100 shown in FIG. 1 and FIG. 2.

FIGS. 3A-3C illustrate exemplary designs in which the tubular sensor body 130 is coupled indirectly via the annular member 160 with the center shaft 120. As shown in the design of FIG. 3A, in some embodiments, the tubular sensor body 130 includes the inclined surface 136, and the annular member 160 surrounding the sleeve member 110 abuts the inclined surface 136 and the center shaft 120, in which the annular member 160 includes an inclined surface 162 (e.g., a conical peripheral surface) parallel to and abutting the inclined surface 136. In other words, the inclined surface 162 of the annular member 160 and the inclined surface 136 of the tubular sensor body 130 provide a surface-to-surface contact region to avoid undesired relative movement along the radial direction between the sensor coils 138a, 138b located on the bobbin 132 and the sleeve member 110.

As shown in the design of FIG. 3B, in some embodiments, the annular member 160 without an inclined surface may be placed abutting the inclined surface 136 and the center shaft 120. Accordingly, a line contact is provided between the annular member 160 and the inclined surface 136 of the tubular sensor body 130 to avoid undesired relative movement along the radial direction between the sensor coils 138a, 138b located on the bobbin 132 and the sleeve member 110.

As shown in the design of FIG. 3C, in some embodiments, the tubular sensor body 130 is designed without the inclined surface at the non-drive side 140. The annular member 160 having the inclined surface 162 is placed abutting the center shaft 120 and the tubular sensor body 130. Accordingly, a line contact is provided between the tubular sensor body 130 and the inclined surface 162 of the annular member 160 to avoid undesired relative movement along the radial direction between the sensor coils 138a, 138b located on the bobbin 132 and the sleeve member 110.

FIGS. 3D-3F illustrate examples of designs in which the tubular sensor body 130 is coupled directly with the center shaft 120, without the annular member 160. As shown in the design of FIG. 3D, in some embodiments, the tubular sensor body 130 includes the inclined surface 136, and the center shaft 120 includes an inclined surface 122 (e.g., a conical peripheral surface) inclined with respect to the radial direction of the torque sensor 100. The inclined surface 122 is parallel to and abutting the inclined surface 136. In other words, the inclined surface 122 of the center shaft 120 and the inclined surface 136 of the tubular sensor body 130 abut to each other and provide a surface-to-surface contact region to avoid undesired relative movement along the radial direction between the sensor coils 138a, 138b located on the bobbin 132 and the sleeve member 110.

As shown in the design of FIG. 3E, in some embodiments, the center shaft 120 is designed without the inclined surface. Accordingly, a line contact is provided between the center shaft 120 and the inclined surface 136 of the tubular sensor body 130 abutting the center shaft 120 to avoid undesired relative movement along the radial direction between the sensor coils 138a, 138b located on the bobbin 132 and the sleeve member 110.

As shown in the design of FIG. 3F, in some embodiments, the tubular sensor body 130 is designed without the inclined surface at the non-drive side 140. The center shaft 120 having the inclined surface 122 abuts the tubular sensor body 130. Accordingly, a line contact is provided between the tubular sensor body 130 and the inclined surface 122 of the center shaft 120 abutting the tubular sensor body 130 to avoid undesired relative movement along the radial direction between the sensor coils 138a, 138b located on the bobbin 132 and the sleeve member 110.

Figure 3G:
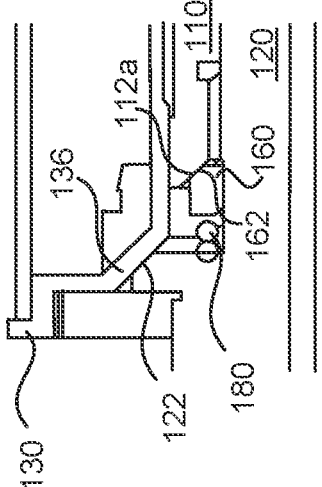
Figure 3H:
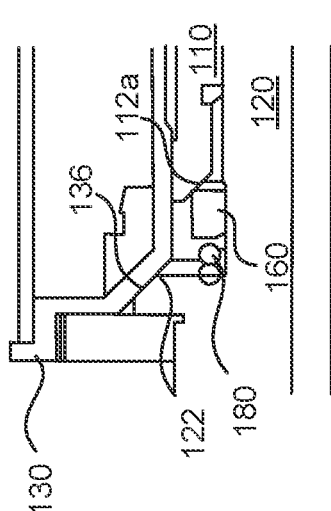
Figure 3I:
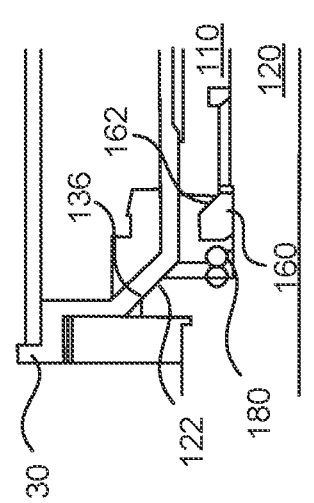

FIGS. 3G-3I illustrate examples of designs in which the tubular sensor body 130 is coupled directly with the center shaft 120, and the annular member 160 is coupled with the sleeve member 110. Similar to the design of FIG. 3D, in the designs of FIGS. 3G-3I, the tubular sensor body 130 includes the inclined surface 136, and the center shaft 120 includes the inclined surface 122 (e.g., a conical peripheral surface) inclined with respect to the radial direction of the torque sensor 100. The inclined surface 122 is parallel to and abutting the inclined surface 136. In addition, a spring 180 is compressed between the center shaft 120 and the annular member 160 to provide a force pushing the annular member 160 toward the sleeve member 110, to avoid undesired relative movement between the sensor coils 138a, 138b located on the bobbin 132 and the sleeve member 110.

As shown in the design of FIG. 3G, in some embodiments, the annular member 160 includes an inclined surface 162, and the sleeve member 110 includes an inclined surface 112a, which is parallel to and abuts the inclined surface 162 of the annular member 160. As shown in the design of FIG. 3H, in some embodiments, the annular member 160 without an inclined surface may be placed abutting the inclined surface 112a of the sleeve member 110. Accordingly, a line contact is provided between the annular member 160 and the inclined surface 112a of the sleeve member 110. As shown in the design of FIG. 3I, in some embodiments, the sleeve member 110 is designed without the inclined surface at the non-drive side 140. The annular member 160 having the inclined surface 162 is placed abutting the sleeve member 110. Accordingly, a line contact is provided between the sleeve member 110 and the inclined surface 162 of the annular member 160.

Accordingly, in the designs of FIGS. 3G-3I, the sleeve member 110, the center shaft 120, the annular member 160, and the spring compressed between the center shaft 120 and the annular member 160 provide a mechanism to avoid undesired relative movement along the radial direction between the sensor coils 138a, 138b located on the bobbin 132 and the sleeve member 110.

Similarly, at the drive side 150, the tubular sensor body 130 may also be coupled, directly, or indirectly, with the sleeve member 110, using different designs of the tubular sensor body 130, the sleeve member 110, or an annular member 170 surrounding the sleeve member 110 at the drive side 150. FIGS. 4A-4F are diagrams illustrating exemplary arrangements of corresponding portions of the tubular sensor body 130 and the sleeve member 110 at the drive side 150, according to some embodiments of the present disclosure. Similarly, in various embodiments, the arrangements and designs described in FIGS. 4A-4F may be used to modify the torque sensor 100 shown in FIG. 1 and FIG. 2.

Figure 4A:
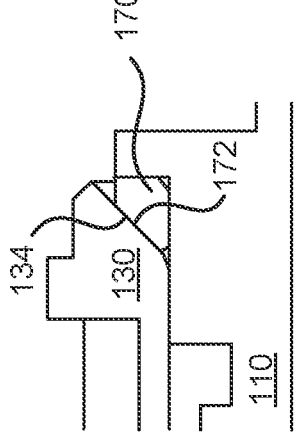
FIGS. 4A-4F are diagrams illustrating examples of arrangements of corresponding portions at a drive side of the torque sensor, according to some embodiments of the present disclosure.
Figure 4B:
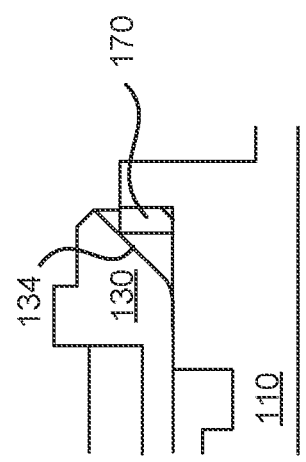
Figure 4C:
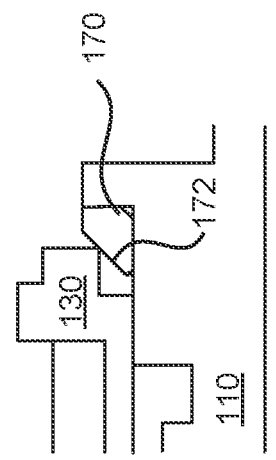

FIGS. 4A-4C illustrate examples of designs in which the tubular sensor body 130 is coupled with the sleeve member 110 indirectly via the annular member 170 surrounding the sleeve member 110. Similar to the annular member 160 in FIGS. 3A-3C, the annular member 170 may be configured to deform to eliminate a gap between the annular member 170 and the sleeve member 110, or a gap between the annular member 170 and the bobbin 132 of the tubular sensor body 130 at the drive side 150.

As shown in the design of FIG. 4A, in some embodiments, the tubular sensor body 130 includes the inclined surface 134, and the annular member 170 surrounding the sleeve member 110 abuts the inclined surface 134 and the sleeve member 110. The annular member 170 also includes an inclined surface 172 (e.g., a conical peripheral surface) parallel to and abutting the inclined surface 134. Accordingly, the inclined surface 172 of the annular member 170 and the inclined surface 134 of the tubular sensor body 130 provide a surface-to-surface contact region to avoid undesired relative movement along the radial direction between the sensor coils 138a, 138b located on the bobbin 132 and the sleeve member 110.

As shown in the design of FIG. 4B, in some embodiments, the annular member 170 without an inclined surface may be placed abutting the inclined surface 134 and the sleeve member 110. Accordingly, a line contact is provided between the annular member 170 and the inclined surface 134 of the tubular sensor body 130 to avoid undesired relative movement along the radial direction between the sensor coils 138a, 138b located on the bobbin 132 and the sleeve member 110.

As shown in the design of FIG. 4C, in some embodiments, the tubular sensor body 130 is designed without the inclined surface at the drive side 150. The annular member 170 having the inclined surface 172 is placed abutting the sleeve member 110 and the tubular sensor body 130. Accordingly, a line contact is provided between the tubular sensor body 130 and the inclined surface 172 of the annular member 170 to avoid undesired relative movement along the radial direction between the sensor coils 138a, 138b located on the bobbin 132 and the sleeve member 110.

Figure 4D:
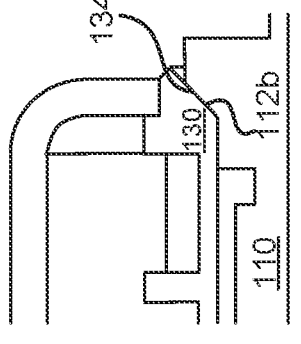
Figure 4E:
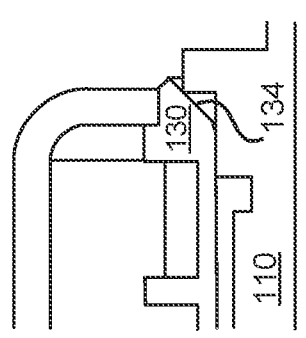
Figure 4E:
Figure 4F:
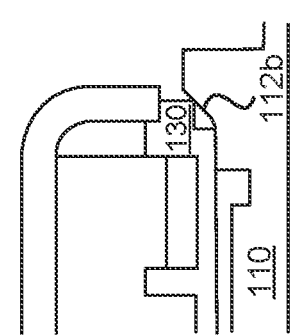

Similarly, FIGS. 4D-4F illustrate examples of designs in which the tubular sensor body 130 is coupled directly with the sleeve member 110 at the drive side 150, without the annular member 170, according to some embodiments of the present disclosure.

As shown in the design of FIG. 4D, in some embodiments, the tubular sensor body 130 includes the inclined surface 134, and the sleeve member 110 includes an inclined surface 112b (e.g., a conical peripheral surface) inclined with respect to the radial direction of the torque sensor 100. The inclined surface 112b is parallel to and abuts the inclined surface 134. Accordingly, the inclined surface 112b of the sleeve member 110 and the inclined surface 134 of the tubular sensor body 130 abut each other and provide a surface-to-surface contact region to avoid undesired relative movement along the radial direction between the sensor coils 138a, 138b located on the bobbin 132 and the sleeve member 110.

As shown in the design of FIG. 4E, in some embodiments, the sleeve member 110 is designed without the inclined surface. Accordingly, a line contact is provided between the sleeve member 110 and the inclined surface 134 of the tubular sensor body 130 abutting the sleeve member 110 to avoid undesired relative movement along the radial direction between the sensor coils 138a, 138b located on the bobbin 132 and the sleeve member 110.

As shown in the design of FIG. 4F, in some embodiments, the tubular sensor body 130 is designed without the inclined surface at the drive side 150. The sleeve member 110 having the inclined surface 112b abuts the tubular sensor body 130. Accordingly, a line contact is provided between the tubular sensor body 130 and the inclined surface 112b of the sleeve member 110 abutting the tubular sensor body 130 to avoid undesired relative movement along the radial direction between the sensor coils 138a, 138b located on the bobbin 132 and the sleeve member 110.

In the embodiments of FIGS. 3A-3C, the annular member 160 surrounding the sleeve member 110 is located between the sleeve member 110 and the tubular sensor body 130. In the embodiments of FIGS. 4A-4C, the annular member 170 surrounding the sleeve member 110 is located between the sleeve member 110 and the tubular sensor body 130. The annular members 160 and 170 may be deformed, such as expanded or contracted, in response to a force applied to the annular members 160 and 170, which can be achieved by various designs. For example, the annular members 160 and 170 may be elastic members that undergo an elastic deformation when a force is applied thereto.

FIGS. 5A-8C illustrate examples of deformable ring structures 500a, 500b, 600, 700, and 800, which can be applied for the annular members 160 and 170, according to some embodiments of the present disclosure. In various embodiments, features disclosed with respect to the ring structures 500a, 500b, 600, 700, and 800 in FIGS. 5A-8C may be combined with the annular members 160 and 170 shown in the above embodiments depicted in FIGS. 1-2, FIGS. 3A-3C, and FIGS. 4A-4C.

Figure 5A:
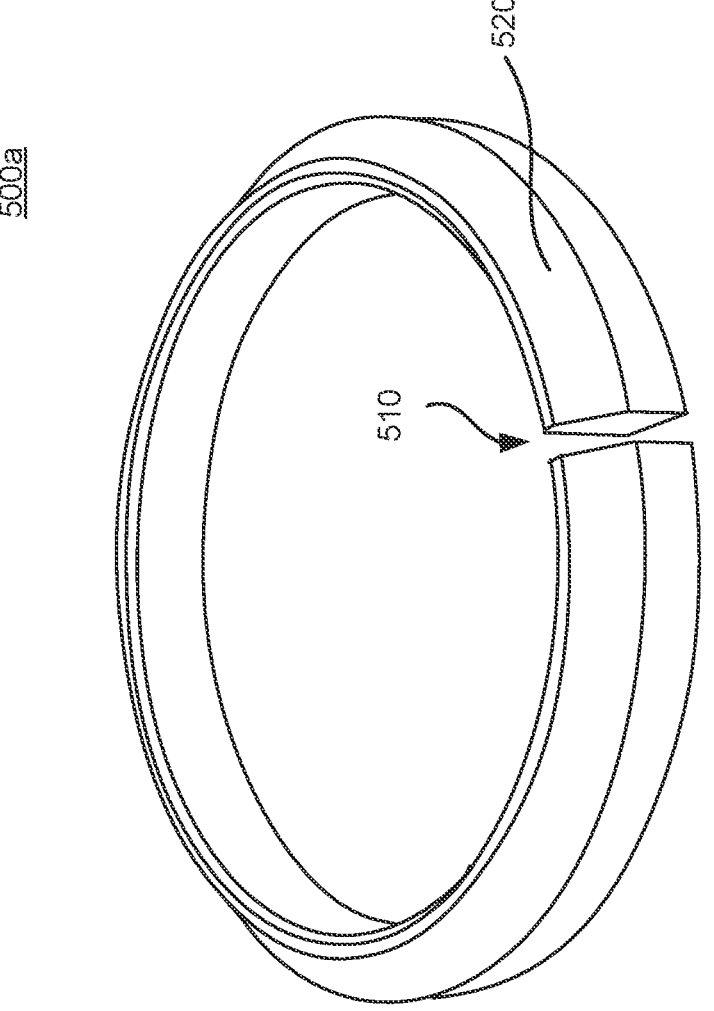
FIG. 5A illustrates an example of a deformable ring structure, according to some embodiments of the present disclosure.
Figure 6:
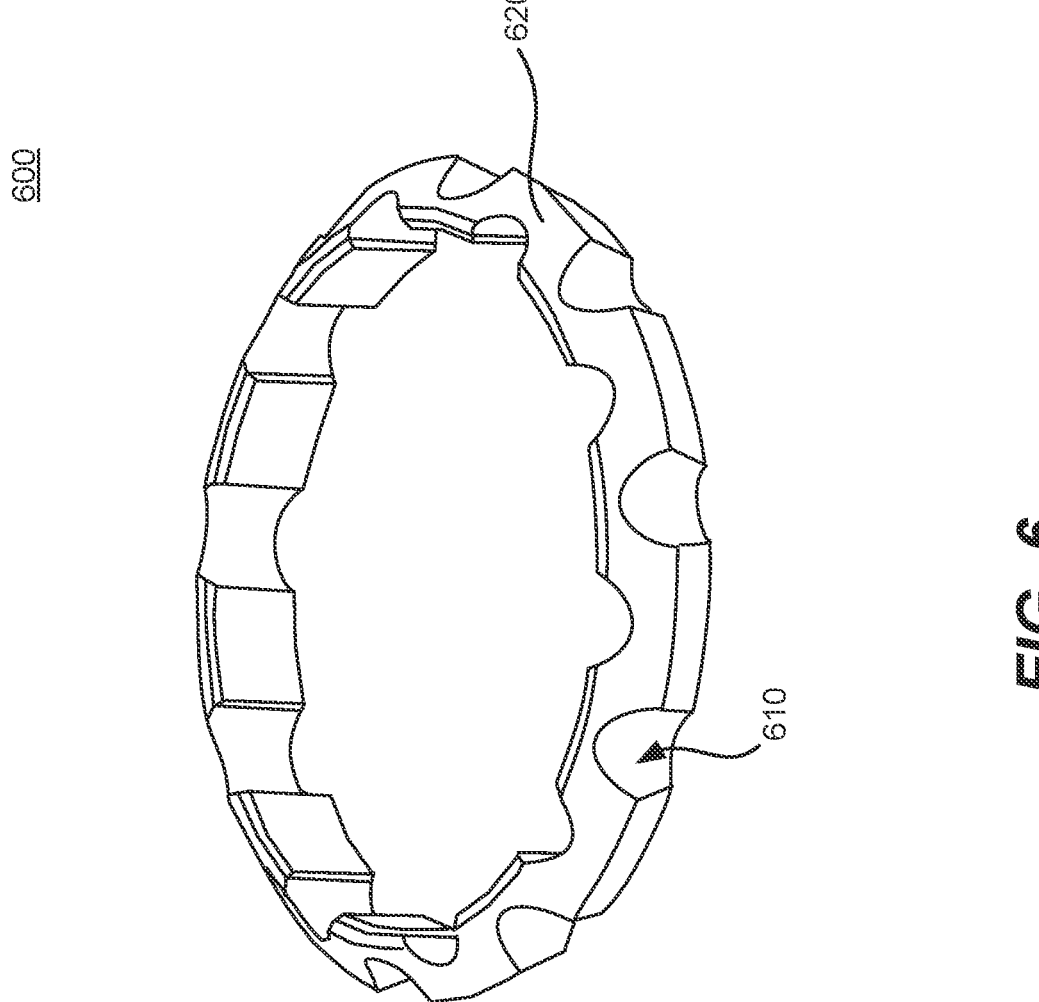
FIG. 6 illustrates an example of a deformable ring structure, according to some embodiments of the present disclosure.

As shown in FIG. 5A, in some embodiments, the deformable ring structure 500a is formed in one piece and includes a slit 510, which provides a deformation margin and allows the expansion or the contraction. In the deformable ring structure 500a, an inclined surface 520 (e.g., a conical peripheral surface) is provided for abutting the tubular sensor body 130. In the embodiments of FIG. 6, the deformable ring structure 600 may be formed of suitable flexible or elastic materials.

Figure 5B:
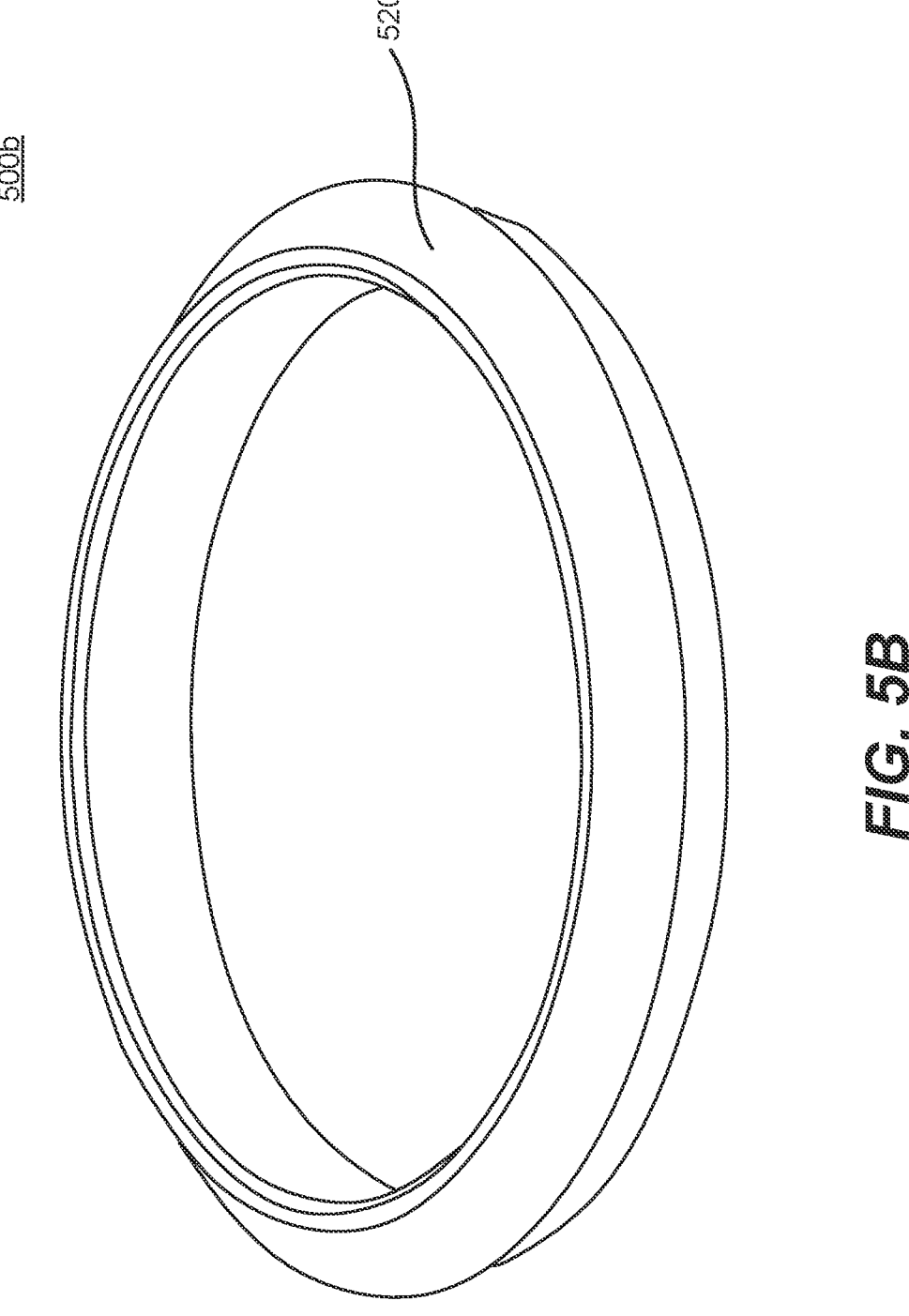
FIG. 5B illustrates an example of a deformable ring structure, according to some embodiments of the present disclosure.

As shown in FIG. 5B, in some other embodiments, the deformable ring structure 500b may also have a closed annular shape without any slit. The deformable ring structure 500*b* with the closed annular shape may be formed by an elastic member to permit elastic deformation. Similar to the embodiment depicted in FIG. 5A, the deformable ring structure 500*b* may provide the inclined surface 520 for abutting the tubular sensor body 130.

As shown in FIG. 6, in some embodiments, the deformable ring structure 600 is formed in one piece and includes concave patterns 610 on both external and internal sides of the ring alternatingly to permit expansion or contraction of the deformable ring structure 600. Similarly, an inclined surface 620 (e.g., a conical peripheral surface) of the deformable ring structure 600 may be provided for abutting the tubular sensor body 130.

Figure 7:
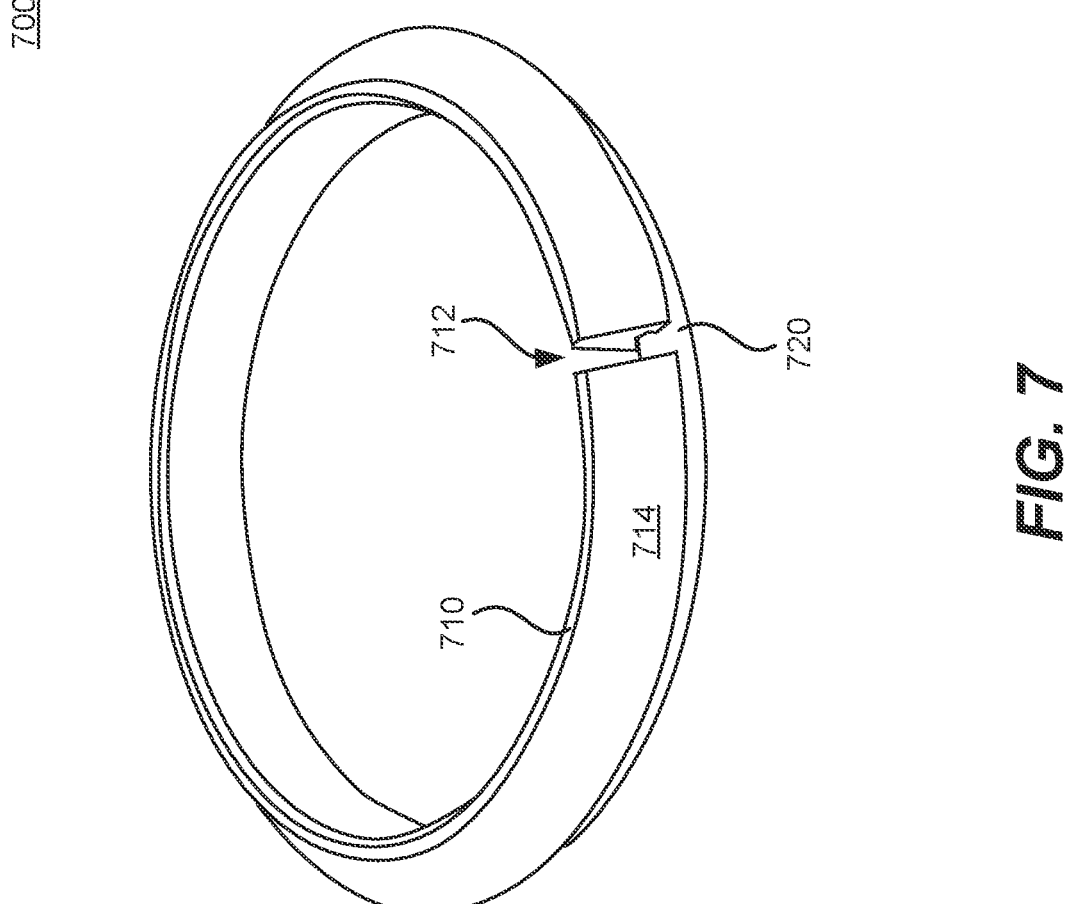
FIG. 7 illustrates an example of a deformable ring structure, according to some embodiments of the present disclosure.

As shown in FIG. 7, in some embodiments, the deformable ring structure 700 includes a deformable portion 710 and a connecting portion 720 coupled to the deformable portion 710, but the present disclosure is not limited thereto. In some other embodiments, the connecting portion 720 may be optional. The deformable portion 710 may include a slit 712 providing a deformation margin and permitting expansion or contraction of the deformable portion 710, while the connecting portion 720 has a closed annular shape to support the deformable portion 710. Similarly, the deformable portion 710 may provide an inclined surface 714 (e.g., a conical peripheral surface) for abutting the tubular sensor body 130.

Figure 8A:
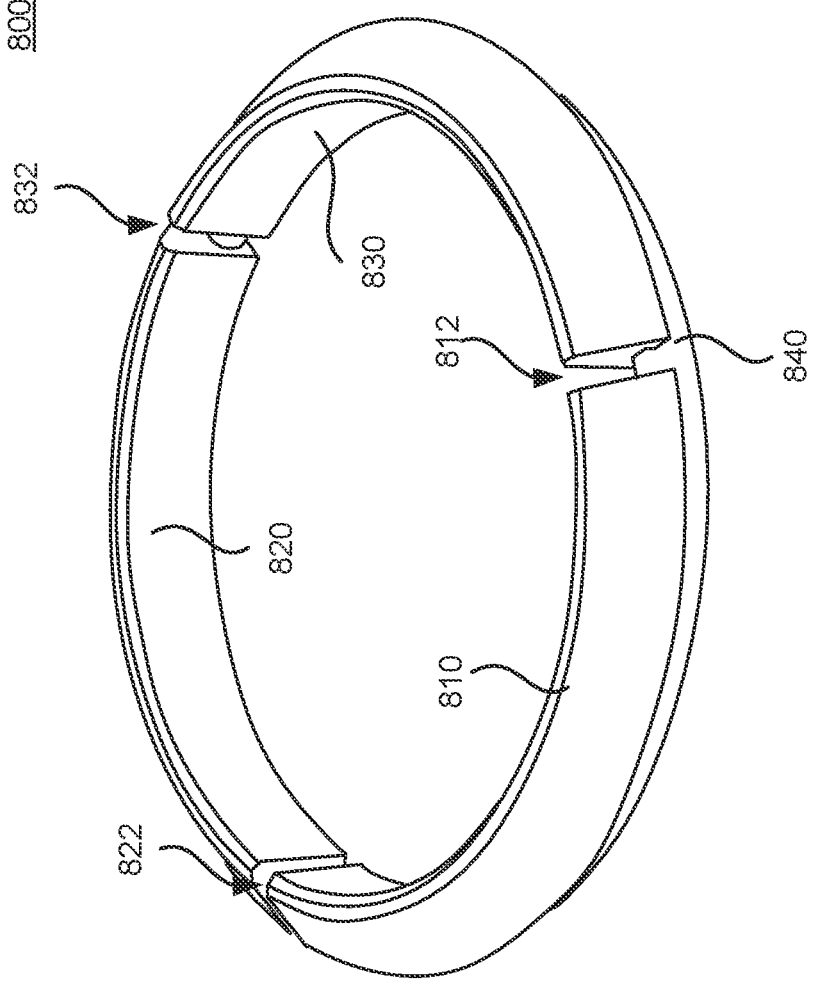
FIGS. 8A-8C illustrate an example of a deformable ring structure, according to some embodiments of the present disclosure.
Figure 8C:
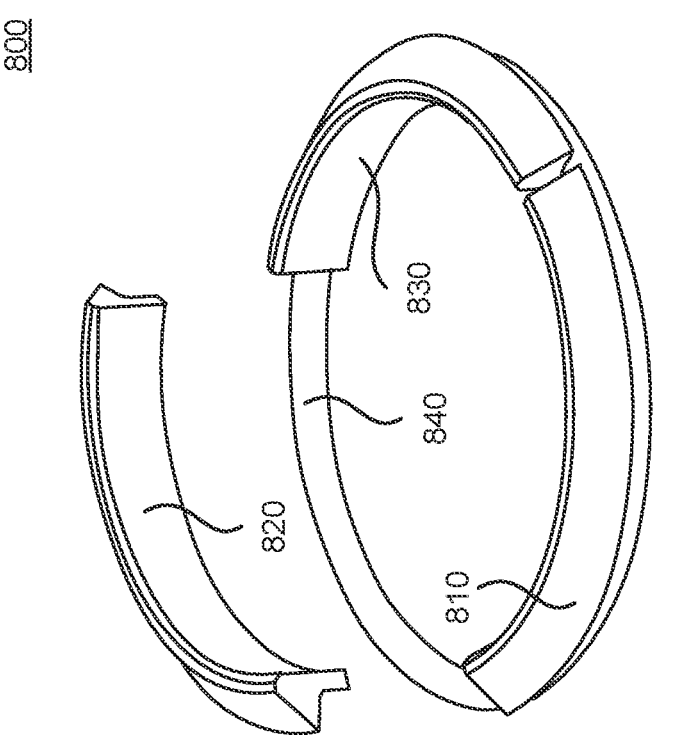
Figure 8B:
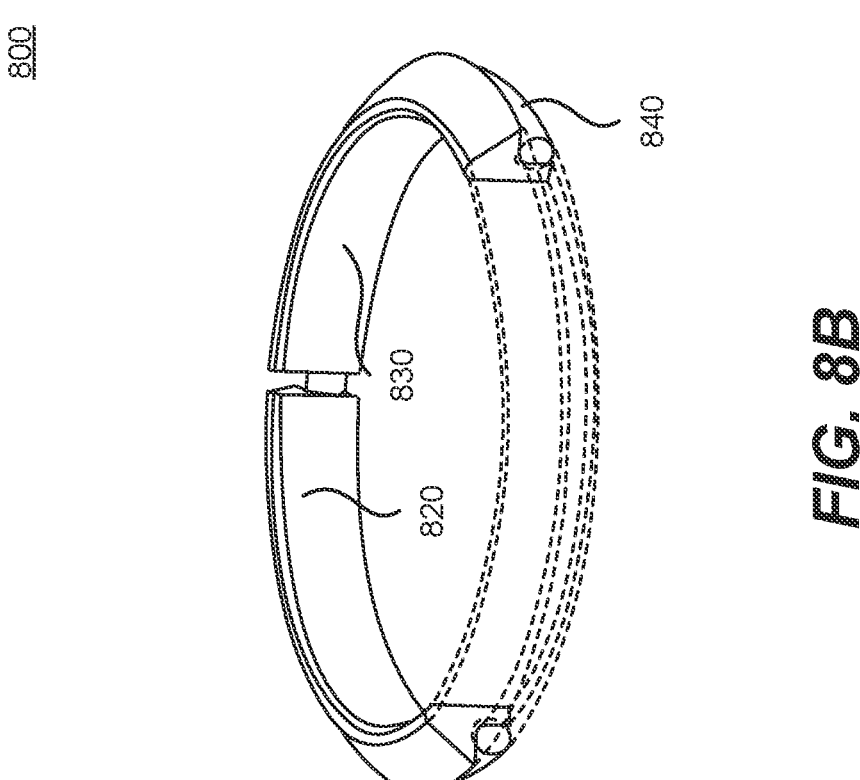

As shown in FIGS. 8A-8C, in some embodiments, the deformable ring structure 800 may also include multiple deformable portions 810, 820, and 830, and a connecting portion 840 with a closed annular shape coupled to the deformable portions 810, 820, and 830. Similar to the embodiments discussed above, the connecting portion 840 may be optional. The deformable portions 810, 820, and 830 may be mounted on the connecting portion 840 and spaced apart from each other by respective slits 812, 822, and 832 between any two of the deformable portions 810, 820, and 830. Accordingly, the slits 812, 822, and 832 permit expansion or contraction of the deformable ring structure 800. Similarly, the deformable portions 810, 820, and 830 collectively provide a conical peripheral surface as the inclined surface for abutting the tubular sensor body 130.

It would be appreciated that the designs shown in FIGS. 5A-8C are merely examples and not meant to limit the present disclosure. In various embodiments, other designs are possible for the annular members 160 and 170 to achieve the elastic deformation to eliminate gaps between the annular members 160, 170 and the sleeve member 110, or between the annular member 160, 170 and the bobbin 132 of the tubular sensor body 130, by the expansion or the contraction of the annular members 160 and 170. Similarly, in some embodiments, a deformable ring structure may have more than the three deformable portions depicted in FIGS. 8A-8C. In other embodiments, a deformable ring structure may have two deformable portions.

Figure 9:
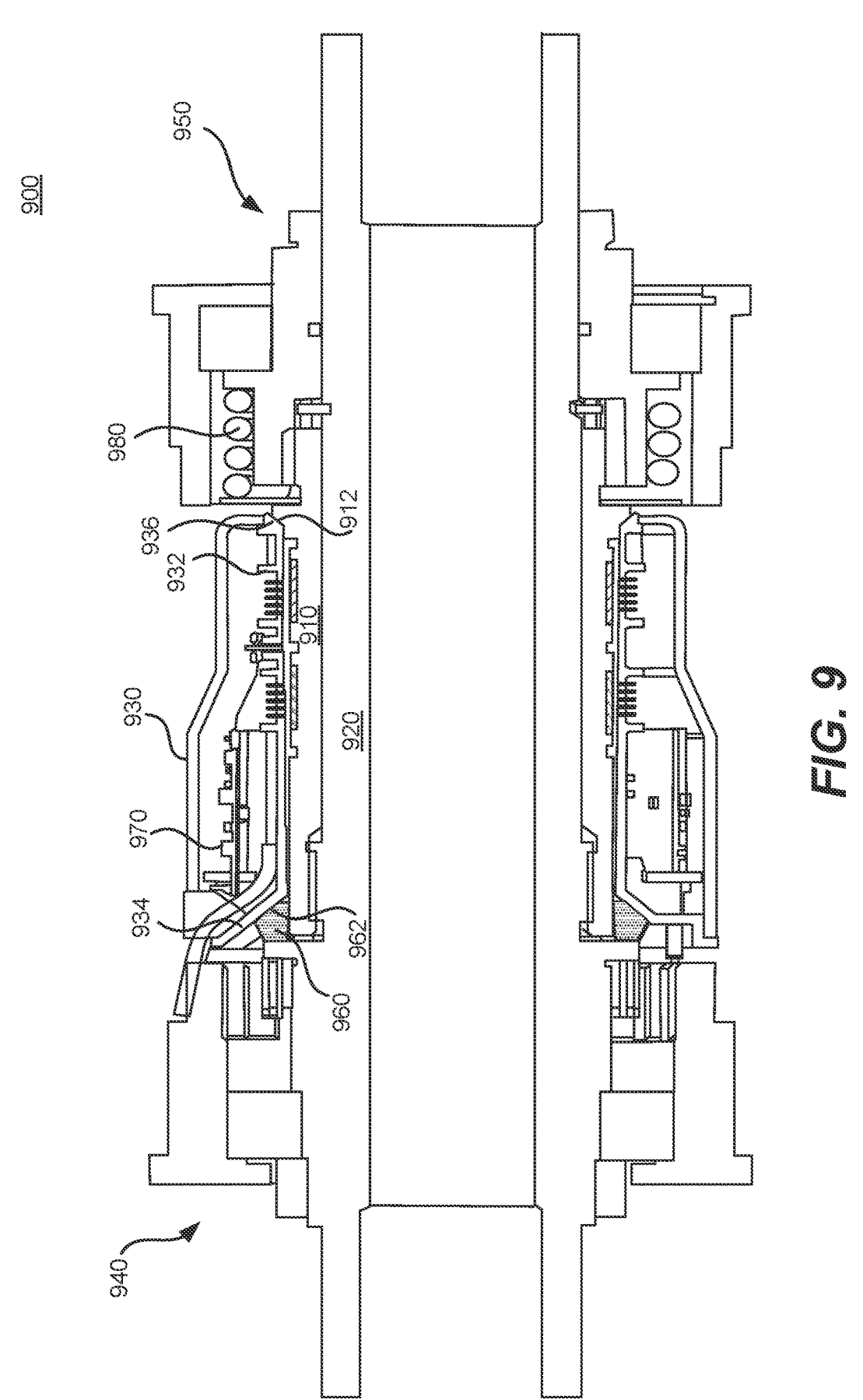
FIG. 9 is a cross-sectional view of an example of a torque sensor, according to some embodiments of the present disclosure.
Figure 10:
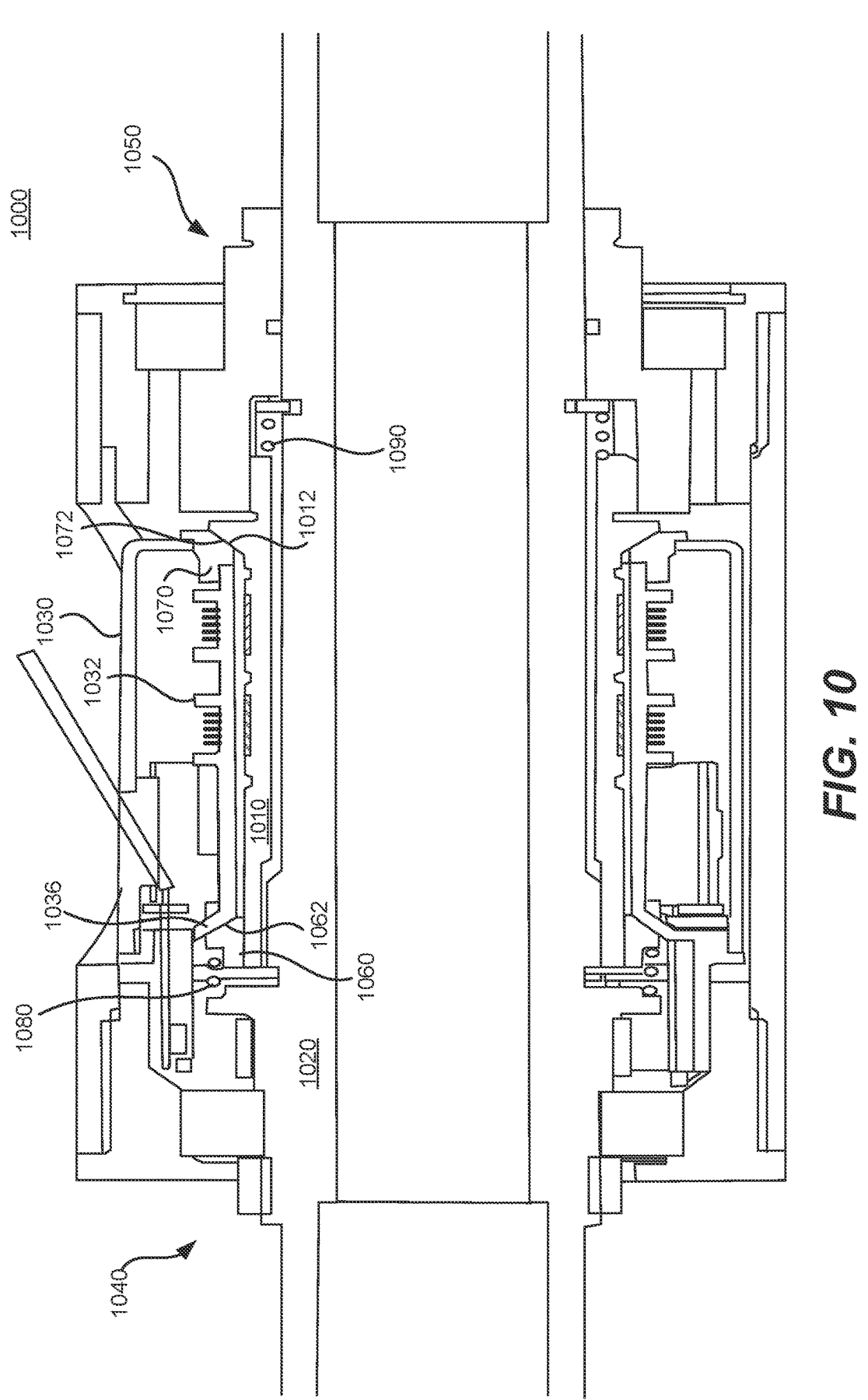
FIG. 10 is a cross-sectional view of an example of a torque sensor, according to some embodiments of the present disclosure.
Figure 11:
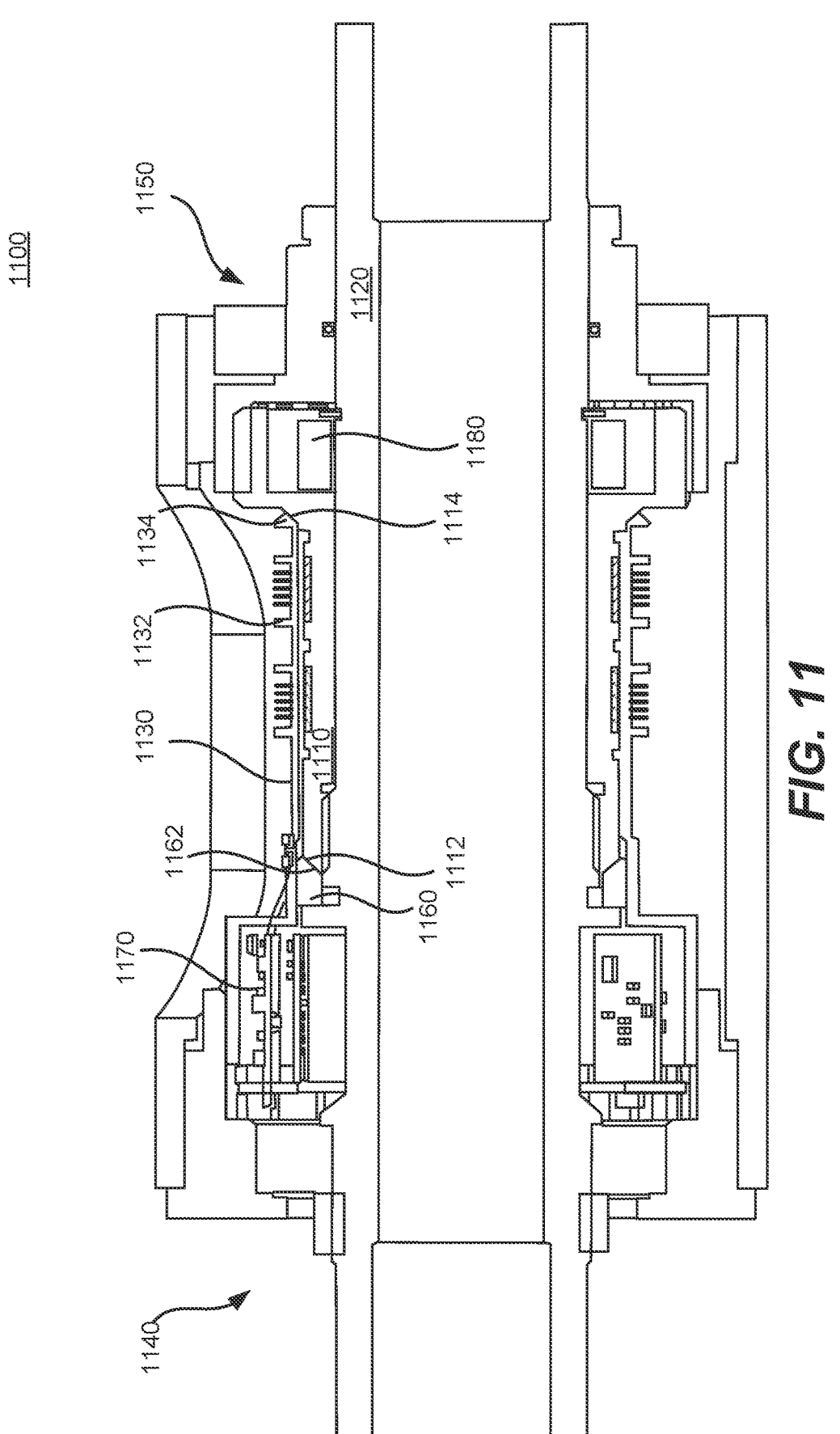
FIG. 11 is a cross-sectional view of an example of a torque sensor, according to some embodiments of the present disclosure.

FIGS. 9-11 respectively illustrate exemplary torque sensors 900, 1000, 1100 according to some embodiments of the present disclosure, which are merely examples and not meant to limit the present disclosure. Similarly, in various embodiments, features disclosed with respect to the arrangements of components at the non-drive side 140 in FIGS. 3A-3I, the arrangements of components at the drive side 150 in FIGS. 4A-4F, and the ring structures 500*a*, 500*b*, 600, 700, and 800 in FIGS. 5A-8C may be combined with torque sensors 900, 1000, 1100 in the embodiments of FIGS. 9-11.

FIG. 9 is a cross-sectional view of another exemplary torque sensor 900, according to some embodiments of the present disclosure. Similar to the embodiments of FIG. 1 and FIG. 2, the torque sensor 900 also cooperates with a bottom bracket of a bicycle or an electrical bicycle for detecting the torque and includes a sleeve member 910 mounted on a center shaft 920 of the bottom bracket, and a tubular sensor body 930 arranged coaxially with the sleeve member 910. As shown in FIG. 9, an electrical circuit 970 may be placed in the tubular sensor body 930 and electrically coupled with the sensor coil(s) to receive, process, read, or detect current or voltage signals from the sensor coil(s) to determine the torque value. In some embodiments, the electrical circuit 970 includes a printed circuit board (PCB) or a flexible printed circuit (FPC) installed in the tubular sensor body 930, but the present disclosure is not limited thereto. The size, location, and/or arrangement of the electrical circuit 970 may vary according to different designs and needs.

At the non-drive side 940, an annular member 960 is placed surrounding the sleeve member 910 and located between the center shaft 920 and the tubular sensor body 930. The annular member 960 may be configured to deform to eliminate a gap between the annular member 960 and the sleeve member 910, or a gap between the annular member 960 and the bobbin 932 of the tubular sensor body 930. An inclined surface 962 of the annular member 960 abuts an inclined surface 934 of the tubular sensor body 930 to provide a surface-to-surface contact region to avoid undesired displacement. At the drive side 950, an inclined surface 912 of the sleeve member 910 and an inclined surface 936 of the tubular sensor body 930 are inclined with respect to the radial direction and are parallel to and abut each other to provide a surface-to-surface contact region to avoid undesired displacement of the tubular sensor body 930. A spring 980 is arranged and compressed to provide a force in the axial direction to the sleeve member 910 via a spring deck structure placed between the spring 980 and the sleeve member 910. In some embodiments, the spring deck may also be a portion of the center shaft 920.

FIG. 10 is a cross-sectional view of yet another example of a torque sensor 1000, according to some embodiments of the present disclosure. Similar to the above embodiments, the torque sensor 1000 also cooperates with a bottom bracket of a bicycle or an electrical bicycle for detecting torque and includes a sleeve member 1010 mounted on a center shaft 1020 of the bottom bracket, and a tubular sensor body 1030 arranged coaxially with the sleeve member 1010.

Compared to the embodiments depicted in FIG. 9, at the non-drive side 1040, an annular member 1060 is placed surrounding the sleeve member 1010 and is located between the center shaft 1020 and the tubular sensor body 1030. The annular member 1060 may be configured to deform to eliminate a gap between the annular member 1060 and the bobbin 1032 of the tubular sensor body 1030. An inclined surface 1062 of the annular member 1060 abuts an inclined surface 1036 of the tubular sensor body 1030 to provide a surface-to-surface contact region to avoid undesired displacement. At the drive side 1050, an end portion 1070 of the bobbin 1032 is located between the sleeve member 1010 and the tubular sensor body 1030. In some embodiments, the end portion 1070 is coated with Polytetrafluoroethylene (PTFE), or another low-friction or self-lubricating material. An inclined surface 1072 of the end portion 1070 abuts the inclined surface 1012 of the sleeve member 1010 to provide a surface-to-surface contact region to avoid undesired relative movement along the radial direction between the sensor coils located on the bobbin 1032 and the sleeve member 1010.

In addition, the torque sensor 1000 further includes one or more springs 1080, 1090. The spring 1080 may be compressed between the annular member 1060 and the center shaft 1020 at one end, and another spring 1090 may be compressed between the sleeve member 1010 and the center shaft 1020 at another end. Accordingly, the spring 1080 provides a force to the annular member 1060, and then the force is transmitted to the inclined surface 1036 of the tubular sensor body 1030. The spring 1090 also provides a force to the sleeve member 1010, and then the force is transmitted to the end portion 1070 and the tubular sensor body 1030 abutting the end portion 1070 accordingly. While the torque sensor 1000 of FIG. 10 may include springs 1080 and 1090 at both ends, in some embodiments, the torque sensor 1000 may include only a single spring (e.g., spring 1080 or spring 1090). In some embodiments, the springs 1080 and 1090 may be a coil spring, such as a conical coil spring or a cylindrical spring. In other embodiments, the springs 1080 and 1090 may be realized by a flat wire coil spring, a round wire coil spring, a wave spring, or any other deformable elastic member providing a force. In other embodiments, the springs 1080 and 1090 may be other types of springs known in the art.

FIG. 11 is a cross-sectional view of another example of a torque sensor 1100, according to some embodiments of the present disclosure. Similar to the above embodiments, the torque sensor 1100 also cooperates with a bottom bracket of a bicycle or an electrical bicycle for detecting torque. In the torque sensor 1100 depicted in FIG. 11, a sleeve member 1110 is mounted on a center shaft 1120 of the bottom bracket, and a tubular sensor body 1130 is arranged coaxially with the sleeve member 1110. As shown in FIG. 11, an electrical circuit 1170 may be placed in the tubular sensor body 1130 to receive, process, read, or detect current or voltage signals from the sensor coil(s). An elastic member 1180, or a spring, may be arranged and compressed to provide a force in the axial direction to the sleeve member 1110. In some embodiments, the elastic member 1180, or the spring, may be placed between the sleeve member 1110 and a C-ring structure installed on the center shaft 1120.

Compared to the embodiments depicted in FIG. 10, at the non-drive side 1140, an annular member 1160 is placed surrounding the center shaft 1120 and configured to deform to eliminate a gap between the annular member 1160 and the bobbin 1132 of the tubular sensor body 1130. In some embodiments, the annular member 1160 and the sleeve member 1110 respectively include inclined surfaces 1162 and 1112 inclined with respect to the radial direction and parallel to and abutting each other to provide a surface-to-surface contact region to avoid undesired displacement.

At the drive side 1150, another inclined surface 1114 of the sleeve member 1110 and an inclined surface 1134 of the tubular sensor body 1130 are inclined with respect to the radial direction and are parallel to and abut each other to provide a surface-to-surface contact region to avoid undesired displacement of the tubular sensor body 1130.

In the embodiments of FIGS. 2 and 9-11, any of the annular members 160, 960, 1060, and 1160 may be realized by any one of the deformable ring structures shown in FIGS. 5A-8C, but the present disclosure is not limited thereto.

In view of above, in various embodiments of the present disclosure, by providing one or more inclined surfaces on the tubular sensor body, the sleeve member, the center shaft, and/or annular member(s) placed therebetween, undesired relative displacements along the radial or the axial direction between the sleeve member and sensor coils installed in the tubular sensor body is reduced or avoided. Accordingly, induced current signals sensed by the sensor coils can be processed by control circuits to estimate the torque more accurately, and the overall accuracy and precision of the torque detection during the pedaling of the user can be increased.

As used herein, the term "or" encompasses all possible combinations, except where infeasible. For example, if it is stated that a device, structure, or module may include A or B, then, unless specifically stated otherwise or infeasible, the device, structure, or module may include A, or B, or A and B. As a second example, if it is stated that a device, structure, or module may include A, B, or C, then, unless specifically stated otherwise or infeasible, it may include A, or B, or C, or A and B, or A and C, or B and C, or A and B and C.

It will be apparent to those skilled in the art that various modifications and variations can be made to the disclosed device. Additionally, it is also possible to combine features or components from different embodiments of the present disclosure based on practical needs. Other embodiments will be apparent to those skilled in the art from consideration of the specification and practice of the disclosed device and related methods and operations.

What is claimed is:

1. A torque sensor, comprising:
   a sleeve member configured to be mounted on a center shaft, wherein at least one outer surface of the sleeve member comprises one or more magnetostrictive elements; and
   a tubular sensor body arranged coaxially with the sleeve member, the tubular sensor body comprising a bobbin for mounting a sensor coil, wherein an induced current in the sensor coil is detected in response to pedaling by a user;
   wherein the tubular sensor body comprises one or more inclined surfaces inclined with respect to a radial direction of the torque sensor;
   wherein the one or more inclined surfaces comprise a first inclined surface being configured to abut the center shaft.

2. The torque sensor of claim 1, wherein the one or more inclined surfaces comprise a second inclined surface parallel to and abutting a surface of the sleeve member.

3. The torque sensor of claim 1, wherein the one or more inclined surfaces comprise a second inclined surface, and the torque sensor further comprises:
   an annular member surrounding the sleeve member and abutting the second inclined surface and the sleeve member.

4. The torque sensor of claim 3, wherein the annular member includes a surface being parallel to and abutting the second inclined surface.

5. The torque sensor of claim 3, wherein the annular member is configured to deform to eliminate a gap between the annular member and the sleeve member, or a gap between the annular member and the bobbin.

6. The torque sensor of claim 5, wherein the annular member comprises one or more slits.

7. The torque sensor of claim 1, wherein the first inclined surface is parallel to and abuts a surface of the center shaft.

8. The torque sensor of claim 1, wherein the torque sensor further comprises:
   an annular member surrounding the sleeve member and abutting the first inclined surface and the center shaft.

9. The torque sensor of claim 8, wherein the annular member includes a surface being parallel to and abutting the first inclined surface.

10. The torque sensor of claim 8, further comprising:
    a spring compressed between the annular member and the center shaft.

11. The torque sensor of claim 8, wherein the annular member is configured to deform to eliminate a gap between the annular member and the sleeve member, or a gap between the annular member and the bobbin.

12. The torque sensor of claim 1, further comprising:

an annular member surrounding the center shaft and configured to deform to eliminate a gap between the annular member and the bobbin, wherein the annular member and the sleeve member respectively include inclined surfaces inclined with respect to the radial direction and parallel to and abutting each other.

13. A torque sensor, comprising:

a sleeve member configured to be mounted on a center shaft, wherein at least one outer surface of the sleeve member comprises one or more magnetostrictive elements; and a tubular sensor body arranged coaxially with the sleeve member, the tubular sensor body comprising a bobbin for mounting a sensor coil, wherein an induced current in the sensor coil is detected in response to pedaling by a user;

wherein the center shaft comprises one or more inclined surfaces inclined with respect to a radial direction of the torque sensor, the one or more inclined surfaces being configured to abut the tubular sensor body.

14. The torque sensor of claim 13, wherein the tubular sensor body includes a surface inclined with respect to the radial direction, the surface abutting the sleeve member.

15. The torque sensor of claim 13, wherein the tubular sensor body includes a surface inclined with respect to the radial direction, the surface abutting the center shaft.

16. A torque sensor, comprising:

a sleeve member mounted on a center shaft, wherein at least one outer surface of the sleeve member comprises one or more magnetostrictive elements;

a tubular sensor body arranged coaxially with the sleeve member, the tubular sensor body comprising a bobbin for mounting a sensor coil, wherein an induced current in the sensor coil is detected in response to pedaling by a user; and an annular member abutting the tubular sensor body, the annular member comprising an inclined surface inclined with respect to a radial direction of the torque sensor, the inclined surface abutting the center shaft.

17. The torque sensor of claim 16, wherein the annular member comprises:

a deformable ring structure surrounding the sleeve member and located between the sleeve member and the tubular sensor body, wherein the inclined surface of the deformable ring structure abuts the sleeve member.

18. The torque sensor of claim 16, wherein the annular member comprises:

a deformable ring structure surrounding the sleeve member and located between the center shaft and the tubular sensor body, wherein the inclined surface of the deformable ring structure abuts with the tubular sensor body.

19. The torque sensor of claim 16, wherein the annular member comprises:

a deformable ring structure surrounding the center shaft and abutting the sleeve member and the center shaft, wherein the deformable ring structure is configured to eliminate a gap between the deformable ring structure and the bobbin, the inclined surface of the deformable ring structure being parallel to and abutting a surface of the sleeve member.

20. The torque sensor of claim 16, wherein the annular member is configured to deform to eliminate a gap between the annular member and the sleeve member or a gap between the annular member and the tubular sensor body.

* * * * *